US012749862B2

(12) United States Patent
Laux et al.

(10) Patent No.: US 12,749,862 B2

(45) Date of Patent: Sep. 29, 2026

(54) DEVICE FOR AMPLIFYING A LASER BEAM

(71) Applicant: THALES, Courbevoie (FR)

(72) Inventors: Sébastien Laux, Elancourt Cedex (FR); Alain Pellegrina, Elancourt Cedex (FR); Sandrine Ricaud, Elancourt Cedex (FR); Olivier Casagrande, Elancourt Cedex (FR); Mathilde Charbonneau, Elancourt Cedex (FR)

(73) Assignee: THALES, Courbevoie (FR)

( * ) Notice: Subject to any disclaimer, the term of this patent is extended or adjusted under 35 U.S.C. 154(b) by 621 days.

(21) Appl. No.: 18/267,727

(22) PCT Filed: Dec. 16, 2021

(86) PCT No.: PCT/EP2021/086116

§ 371 (c)(1),
(2) Date: Jun. 15, 2023

(87) PCT Pub. No.: WO2022/129293

PCT Pub. Date: Jun. 23, 2022

(65) Prior Publication Data

US 2024/0055818 A1 Feb. 15, 2024

(30) Foreign Application Priority Data

Dec. 17, 2020 (FR) ....................................... 2013475

(51) Int. Cl.

*H01S 3/23* (2006.01)
*H01S 3/00* (2006.01)
*H01S 3/02* (2006.01)

(52) U.S. Cl.

CPC ............ *H01S 3/0071* (2013.01); *H01S 3/025* (2013.01); *H01S 3/2333* (2013.01)

(58) Field of Classification Search

CPC ...... H01S 3/0071; H01S 3/025; H01S 3/2333; H01S 3/005; H01S 2301/02;
(Continued)

(56) References Cited

U.S. PATENT DOCUMENTS 5,172,263 A * 12/1992 Hale ..................... H01S 3/0606 359/347
6,834,064 B1 12/2004 Paschotta et al.
(Continued)

FOREIGN PATENT DOCUMENTS

CN 1411113 A 4/2003
CN 102664340 A 9/2012
(Continued)

OTHER PUBLICATIONS

English translation of WO2014067888.*
(Continued)

*Primary Examiner* — Xinning (Tom) Niu
(74) *Attorney, Agent, or Firm* — Soquel Group LLC

(57) ABSTRACT

The present invention relates to a device for amplifying a multi-wavelength laser beam, comprising:

Figure 1:
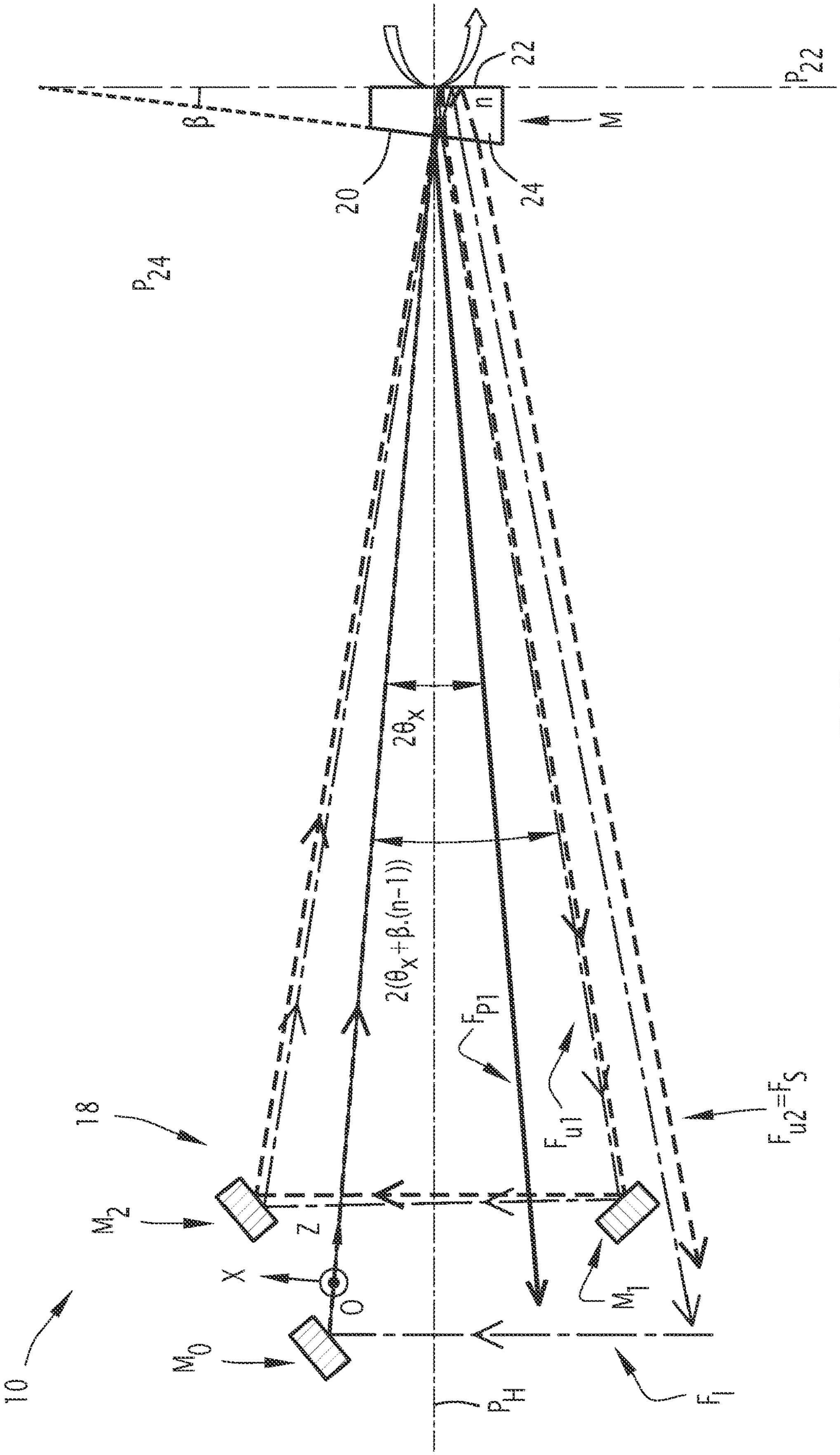

a. An active laser medium having a front face suitable for receiving the beam to be amplified each time the same passes through the active laser medium, and a reflective rear face inclined with respect to the front face, the beam reflected by the rear face and refracted by the front face during the n-th pass being called the n-th useful beam, and
b. a first optical return unit arranged along the path of the first useful beam and configured for returning the first useful beam on the front face for a second pass through the active laser medium so that the sub-beams of each wavelength, forming the second useful beam, are parallel to each other at the end of the second pass.

9 Claims, 5 Drawing Sheets

(58) Field of Classification Search
CPC .... H01S 3/2325; H01S 3/2341; H01S 3/0621; H01S 3/0606; H01S 3/0064; H01S 3/0623
See application file for complete search history.

(56) References Cited

U.S. PATENT DOCUMENTS

| | | | | |
|---|---|---|---|---|
| 2001/0021215 | A1 * | 9/2001 | Bunting | H01S 3/09415 372/70 |
| 2007/0070485 | A1 | 3/2007 | Trebino | |
| 2009/0052481 | A1 | 2/2009 | Kimura et al. | |
| 2015/0171587 | A1 * | 6/2015 | Schad | H01S 5/141 372/36 |
| 2015/0303642 | A1 | 10/2015 | Laux et al. | |

FOREIGN PATENT DOCUMENTS

| | | | | |
|---|---|---|---|---|
| CN | 104767116 | A | 7/2015 | |
| CN | 104885314 | A | 9/2015 | |
| CN | 105992971 | A | 10/2016 | |
| CN | 108896537 | A | 11/2018 | |
| CN | 110021872 | A | 7/2019 | |
| EP | 2475054 | A1 | 7/2012 | |
| EP | 2915226 | A2 | 9/2015 | |
| JP | 2002280651 | A | 9/2002 | |
| JP | 200954651 | A | 3/2009 | |
| JP | 2010520491 | A | 6/2010 | |
| JP | 2013502725 | A | 1/2013 | |
| JP | 2016500928 | A | 1/2016 | |
| KR | 1020150079675 | A | 7/2015 | |
| WO | WO-2014067888 | A2 * | 5/2014 | H01S 3/0604 |
| WO | 2014067888 | A3 | 7/2014 | |

OTHER PUBLICATIONS

French Application No. 20 13475, Search Report mailed Aug. 26, 2021, 2 pages.

International Patent Application No. PCT/EP2021/086116, Search Report mailed May 19, 2022, 6 pages.

Negel Jan-Philipp et al: "Thin-disk multipass amplifier for fs pulses delivering 400 W of average and 2.0 GW of peak power for linear polarization as well as 235 W and 1.2 GW for radial polarization", Applied Physics B: Lasers and Optics, Springer International, Berlin, DE, vol. 123, No. 5, Apr. 26, 2017 (Apr. 26, 2017), pp. 1-8, XP036246808, ISSN: 0946-2171, DOI: 10.1007/S00340-017-6739-2 [extrait le Apr. 26, 2017].

* cited by examiner

DEVICE FOR AMPLIFYING A LASER BEAM

CROSS-REFERENCE TO RELATED APPLICATIONS

This application is a national stage filing of International Application No. PCT/EP2021/086116, filed Dec. 16, 2021, which claims priority to French Application No. 20 13475, filed Dec. 17, 2020. The entire disclosures of the aforementioned patent applications are incorporated herein by reference.

The present invention relates to a device for amplifying a multi-wavelength laser beam.

The field of the invention is the field of solid-state laser sources for scientific, industrial, medical and military applications. More specifically, the invention is advantageously used for active laser medium materials (such as a crystal) which have a relatively small thickness compared to the aperture thereof along the axis of propagation of the laser beam, typically less than 1:3.

The technology of pumping lasers has substantially developed in recent years and it is now possible to have a pulsed laser source which gives an average pumping power on the order of one hundred watts.

However, a certain number of configurations are not compatible with the new generation of pump lasers for which high energy and high average power (higher repetition rate) are sought.

In the current state of the art, different solutions are used for the extraction of thermal energy in an active laser medium, by working on the form factor of the active laser medium, typically amplifier fibers, very thin disks, slab and so-called thick disks.

The thick disc solution is well suited to certain active laser media such as amorphous materials (such as glasses), transparent ceramics or crystals such as Ti:SA (abbreviation for Titanium:Sapphire). Due to the large amplification spectrum of the material, such solution gives access to high energy levels, high average powers, and short pulse durations.

In thick disk technology, the active laser medium (e.g. a crystal) is cooled through rear face thereof. Cooling is then obtained by means of a fluid, either liquid or gas, or a solid. Such cooling through the rear face increases the heat exchange surface. Moreover, same can be used for generating a thermal gradient along the direction of propagation of the laser through the crystal, and also for achieving a high thermal extraction. The index variations related to the variations of temperature in the crystal are gradients oriented mainly along the same direction as the direction of propagation of the laser beam.

However, laser amplification devices with rear surface cooling induce a geometrical turning back of the beam due to the reflective rear surface of the crystal. The output face of the crystal is then the same as the input face, which means that the spurious pulses (due to the spurious reflections on the front face) are found before the main pulse, hence degrading the temporal contrast of the pulse. The temporal contrast is defined as the ratio between the intensity of the main pulse and the foot of the pulse and/or any spurious pulses.

To avoid such degradation, it is known from patent EP 2 915 226 B how to modify the air/crystal interface, so as to separate the main pulse and the spurious pulses. For this purpose, the front face of the active laser medium is inclined with respect to the rear face thereof at a non-zero angle. Thereby, after propagation through the active laser medium, the spurious reflections are spatially separated from the main pulse and the temporal contrast is no longer degraded by the spurious reflections.

For short pulses (with broad spectrum), said angle produces a prismatic effect which is compensated by a compensation prism positioned along the path of the beam, as described in EP 2 915 226 B. Thereby, when a plurality of passes through the active laser medium are carried out, a plurality of prisms have to be used in the amplification system.

Beyond the financial impact, the use of many optical [parts] for transmission is a source of optical loss and a potential source of failure (damage leading to the unavailability of the laser and a cost of repairing the part and labor for realignment).

There is thus a need for an amplification device which would minimize optical losses while remaining satisfactory in terms of cooling and temporal contrast.

To this end, the subject matter of the invention is a device for amplifying a multi-wavelength laser beam, the device comprising:

a. a solid active laser medium having at least two plane faces among: a front face suitable for receiving the beam to be amplified each time said beam passes through the active laser medium, and a reflecting rear face, the front face being inclined with respect to the rear face at a non-zero inclination, the rear face being suitable for being cooled, the beam received on the front face during the first pass being called the incident beam, the beam reflected by the rear face and refracted by the front face during the nth pass being called the nth useful beam, and b. a first optical return unit arranged along the path of the first useful beam, the first optical return unit being configured for returning the first useful beam to the front face for a second pass through the active laser medium so that the sub-beams of each wavelength, forming the second useful beam, are parallel to each other at the end of the second pass.

According to other advantageous aspects of the invention, the device comprises one or a plurality of the following features, taken individually or according to all technically possible combinations:

- the first optical return unit is configured so that the second useful beam is equivalent in terms of chromatic spatial dispersion to the beam which would have been obtained at the output of a plate with plane and parallel faces from an incident beam arriving on the front face of said plate at an angle of incidence equal to the angle of incidence of the incident beam on the active laser medium;
- the active laser medium is a disc the flat faces of which are the front face and the rear face, said faces being inscribed in a right prism with a triangular or trapezoidal base, called the base, the first optical return unit comprising two mirrors oriented so that the path of the first useful beam between the active laser medium and the first mirror is symmetrical, with respect to a plane of symmetry, to the path of the first useful beam between the second mirror and the active laser medium, the plane of symmetry being a plane perpendicular to a plane containing the base of the active laser medium and to a plane containing the rear face;
- the front face of the active laser medium is suitable for receiving the incident beam and for reflecting a beam called the first spurious beam, from the incident beam, the first optical return unit being arranged outside the path of the first spurious beam;

the second useful beam has a larger diameter compared to the diameter of the incident beam, the amplification device comprising a second optical return unit suitable for returning the second useful beam into the active laser medium for at least a third, then a fourth pass so that the last useful beam at the output of the active laser medium, called the output beam, has a diameter substantially equal to the diameter of the incident beam and so that the sub-beams of each wavelength, forming said output beam, are parallel to each other;

the second optical return unit is configured so that the output beam is equivalent in terms of diameter and chromatic spatial dispersion to the beam which would have been obtained following the successive pass of an incident beam in a first, then a second plate with plane and parallel faces, the first plate being oriented so that the incident beam arrives on the front face of the first plate at a first angle of incidence equal to the angle of incidence of the incident beam on the active laser medium, the second plate being oriented so as to receive the beam at the output of the first plate at a second angle of incidence equal to the opposite of the first angle of incidence;

the second optical return unit is suitable for returning the second useful beam into the active laser medium so that the total number of passes of the beam to be amplified through the active laser medium is a multiple of four;

the second optical return unit is suitable for returning the second useful beam into the active laser medium so that the total number of passes of the beam to be amplified through the active laser medium is a multiple of two, and the beam to be amplified travels an outward path and a return path, superimposed on the outward path, between the first input of said beam into the active laser medium and the last output of said beam from the active laser medium;

at each pass through the active laser medium, a spurious beam is obtained which is directly reflected on the front face of the active laser medium, the first and second return units being arranged outside the path of each spurious beam resulting from an odd pass of the beam to be amplified through the active laser medium;

the last useful beam at the output of the active laser medium is called the output beam, the incident beam and the output beam being spatially shifted.

Figure 2:
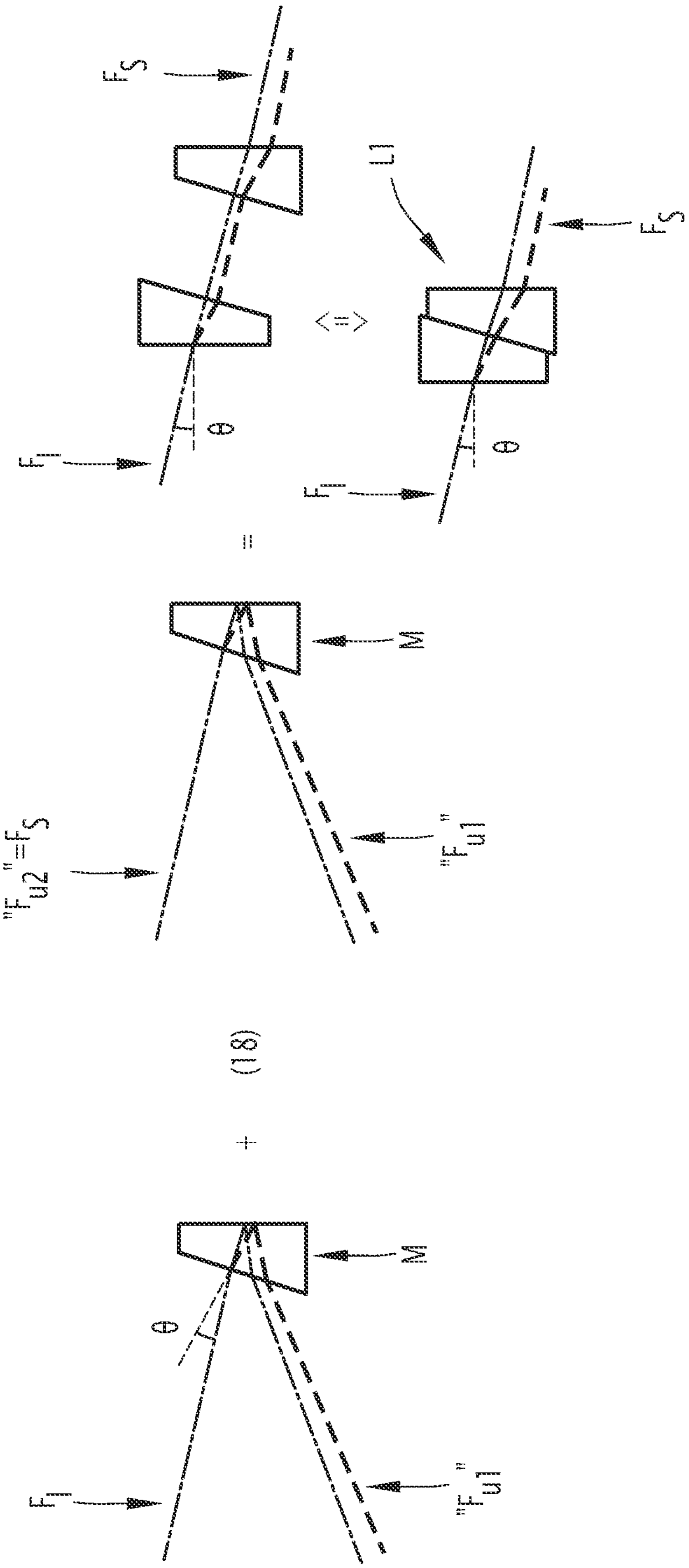
Figure 3:
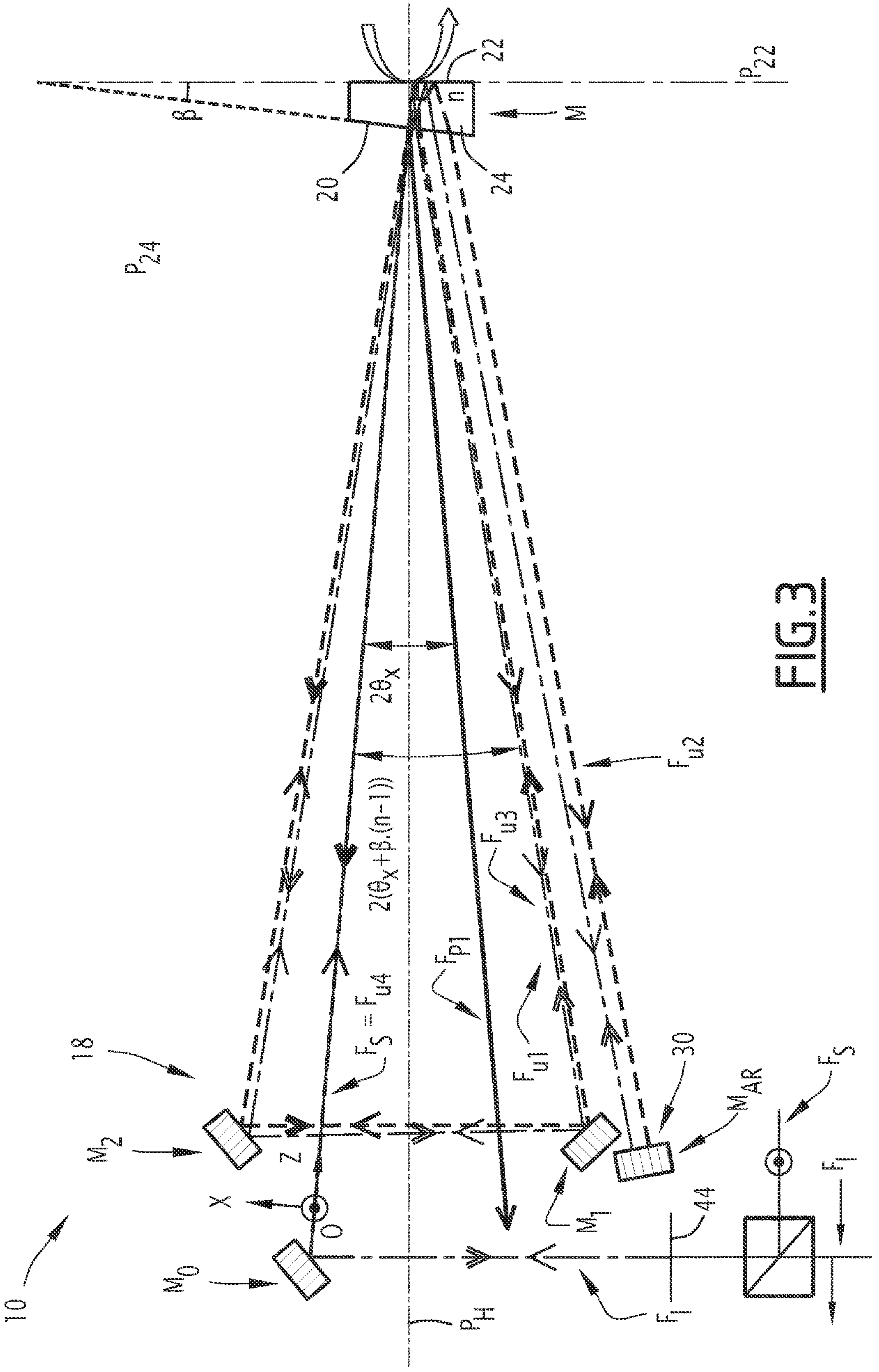
Figure 4:
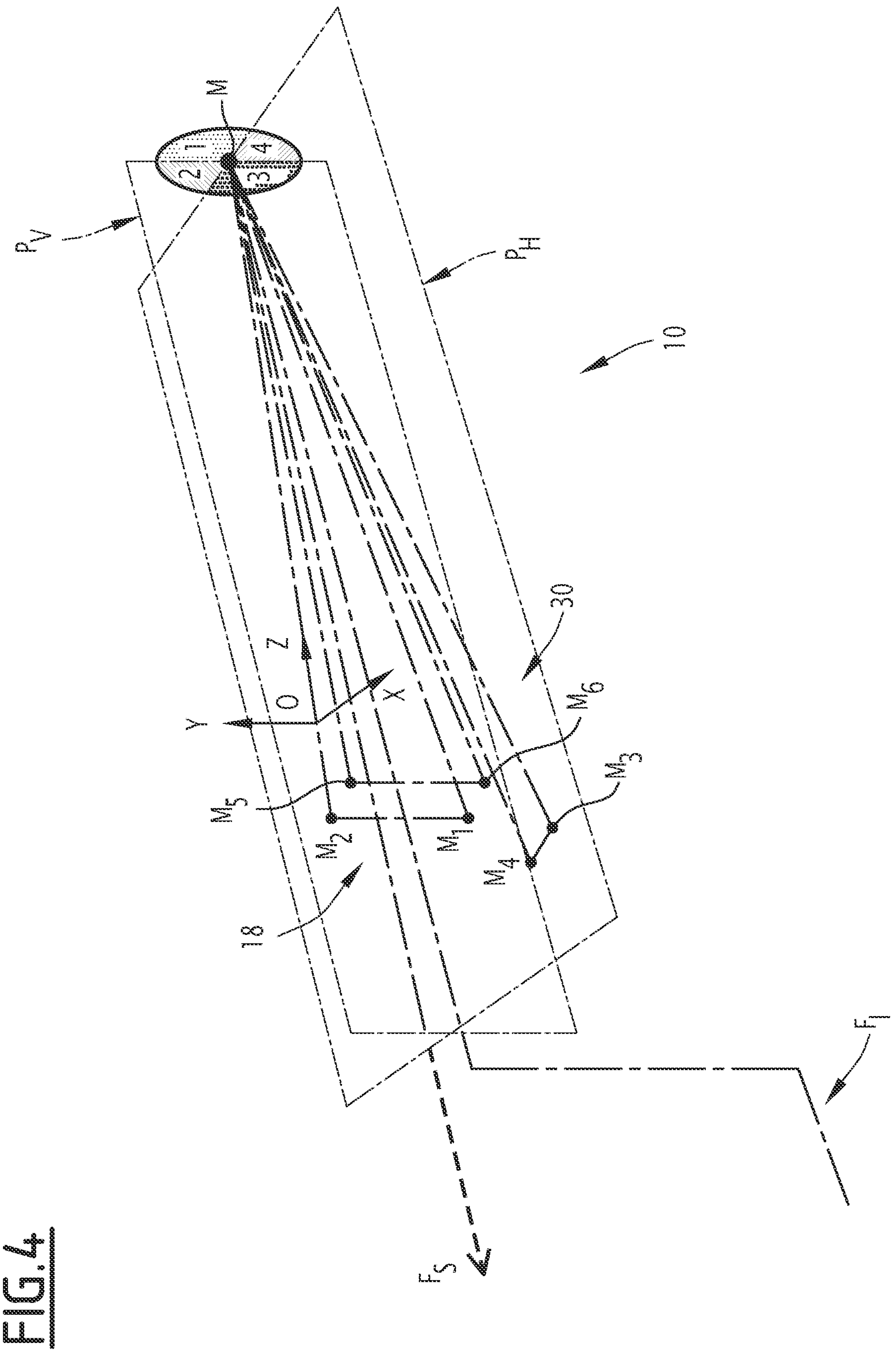
Figure 5:
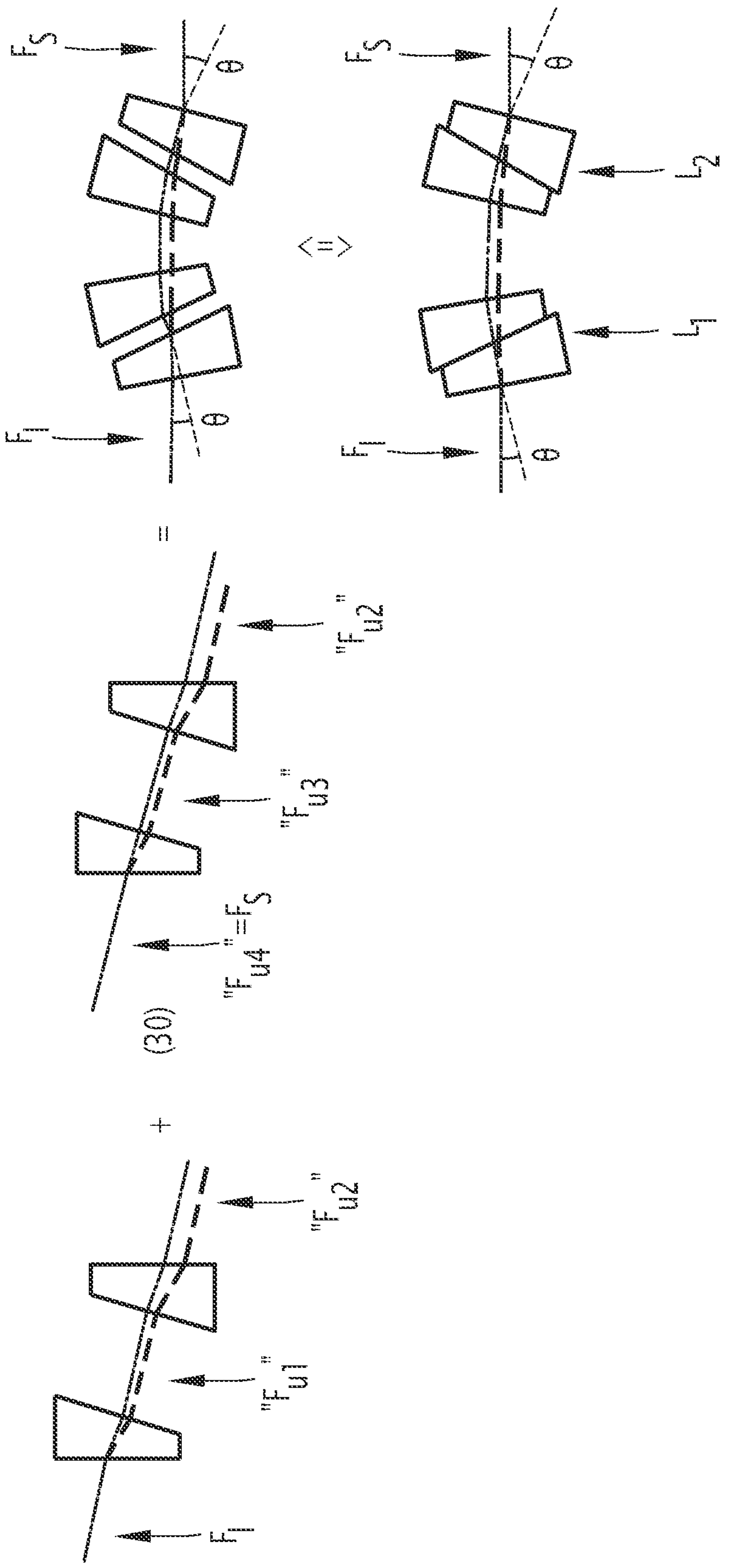

Other features and advantages of the invention will appear upon reading the following description which follows embodiments of the invention, given only as a limiting example, and making reference to the following drawings:

FIG. 1, a schematic top view representation of an amplification device according to a first embodiment, FIG. 2, a schematic representation of an optical system equivalent in terms of chromatic spatial dispersion to the amplification device of the first embodiment, in FIG. 3, a schematic top view representation of a first example of an amplification device according to a second embodiment, the input beam and the output beam of the amplification device being superimposed in the first example and the propagation being carried out in the same plane, FIG. 4, a schematic perspective view representation of a second example of an amplification device according to the second embodiment, the input beam and the output beam of the amplification device being spatially shifted in the second example, and FIG. 5, a schematic representation of an optical device equivalent in terms of chromatic spatial dispersion and chromatic lateral dispersion to the amplification device of the second embodiment.

Hereinafter in the description, a propagation direction z is defined, represented in the figures by an axis z and corresponding to the propagation direction of the laser beam. A first transverse direction is defined, perpendicular to the direction of propagation, and represented in the figures by an axis x, such that the plane (xOz) corresponds to a top view of the amplification device 10. A second transverse direction y is also defined, perpendicular to the direction of propagation z and to the first transverse direction x. The second transverse direction Y is represented in the figures by an axis y and is such that the plane (yOz) corresponds to a side view of the amplification device 10. A person skilled in the art will understand that the notations used for such axes are arbitrary and could be replaced by other notations.

Hereinafter in the description, the term "chromatic spatial dispersion" means the angular dispersion of a beam due to variations in the angle of deviation as a function of wavelengths in an optical surface. The term "chromatic lateral dispersion" means the widening of the diameter of a beam as a function of the wavelengths (shift of the pupils) following passage through two optical surfaces the interfaces of which are parallel (plates with parallel faces).

A first embodiment of an amplification device 10 is illustrated in the FIG. 1.

The amplification device 10 is configured for amplifying a laser beam, in particular a multi-wavelength pulsed laser beam. The beam to be amplified is e.g. an infrared beam.

The beam to be amplified has e.g, an average power greater than 10 Watts (W).

The amplification device 10 according to the first embodiment comprises an active laser medium M and a first optical return unit 18.

Medium M is a solid medium. The medium M is e.g. a crystal such as titanium-doped sapphire, or Yb:YAG, Yb:CaF2 or a polymer, a ceramic or a glass or any other material in the solid state.

The medium M has a refractive index n. Preferentially, the following relationship is verified:

$$n \gg \frac{(n-1)}{v}$$

Where v is the constringence of the active laser medium M. The above is intended to preserve the multi-wavelength character of the beam $F_S$ at the output of the amplification device 10.

The medium M has at least two plane faces among a front face 20 suitable for receiving the beam to be amplified each time said beam passes through the active laser medium M, and a reflecting rear face 22.

The front face 20 is inclined with respect to the rear face 22 at a non-zero inclination β (angle). Hereinafter, β' denotes the projection of the inclination β on the plane (xOz) and β the projection of the inclination β on the plane (yOz). In one example of implementation, the active laser medium M is a disc the faces of which (front 20 and rear 22) are inscribed in a right prism with a triangular or trapezoidal base, called the base 24. The base 24 of the prism, and thus the inclination β, is entirely contained in a plane perpendicular to a plane $P_{22}$ containing the rear face 22 and to a plane perpendicular to the plane (yOz).

The front face 20 of the active laser medium M is suitable for receiving the beam to be amplified each time said beam passes through the active laser medium M and for reflecting a spurious beam (direct reflection) and for refracting a useful beam after such a beam has been reflected by the rear face 22. The beam received on the front face 20 during the first pass is called the incident beam $F_I$. The beam reflected by the rear face 22 and refracted by the front face 20 during the n-th pass is called the n-th useful beam $F_{UN}$. The useful beam at the output of the active laser medium M during the last pass is also called the output beam $F_S$. The beam directly reflected by the front face 20 from the beam to be amplified during the n-th pass is called the n-th spurious beam $F_{Pn}$.

Advantageously, the front face 20 is anti-reflection treated.

The rear face 22 of the active laser medium M is suitable for reflecting, at each pass, the beam to be amplified, after the pass thereof through the front face 20 of the active laser medium M, so as to form the corresponding useful beam.

The rear face 22 is suitable for being cooled by a cooling device which is e.g. comprised in the amplification device 10. The cooling is represented in FIG. 1 by an arrow appended to the rear face 22.

The first optical return unit 18 is arranged along the path of the first useful beam $F_{U1}$. The first optical return unit 18 is configured so as to return the first useful beam $F_{U1}$ onto the front face 20 for a second pass through the active laser medium M so that the sub-beams of each wavelength, forming the second useful beam $F_{U2}$, are parallel to each other at the end of the second pass. In FIG. 1, only two sub-beams are shown so as not to overload the figure. The first optical return unit 18 is thus used for compensating for the chromatic spatial dispersion induced by the prismatic effect resulting from the inclination β between the front face 20 and the rear face 22 of the active laser medium M.

Advantageously, as illustrated in FIG. 2, the first optical return unit 18 is configured in such a way that the second useful beam $F_{U2}$ is equivalent in terms of chromatic spatial dispersion to the beam which would have been obtained at the output of a plate with plane and parallel faces L1 from an incident beam arriving on the front face of said plate at an angle of incidence equal to the angle of incidence Θ of the incident beam $F_I$ on the active laser medium M.

In the example illustrated in FIG. 1, the first optical return unit 18 comprises two mirrors M1, M2 oriented so that the path of the first useful beam $F_{U1}$ between the active laser medium M and the first mirror M1 is symmetrical, with respect to a plane of symmetry $P_H$, to the path of the first useful beam $F_{U1}$ between the second mirror M2 and the active laser medium M. The plane of symmetry $P_H$ is a plane perpendicular to a plane $P_{24}$ containing the base 24 of the active laser medium M and to a plane $P_{22}$ containing the rear face 22.

Thereby, after a first reflection on the mirror M1 and a second reflection on the mirror M2, the image of the beam to be amplified is returned upon arriving on the front face 20 of the active laser medium M. The active laser medium M as such then plays the role of the compensation prism of the prior art. In the particular configuration of FIG. 1, the plane of symmetry $P_H$ is a plane perpendicular to the plane (xOz) (plane of the sheet in FIG. 1) and perpendicular to a plane $P_{22}$ containing the rear face 22, and the image is returned along the direction x.

Advantageously, the first optical return unit 18 does not comprise any prism.

Advantageously, the first optical return unit 18 is arranged outside the path of the first spurious beam $F_{P1}$.

The operation of the amplification device 10 according to the first embodiment will now be described.

Initially, the beam (the pulse) to be amplified $F_I$ of diameter ϕ arrives on the front face 20 of the active laser medium M at an angle of incidence Θ which is broken down into an angle $\Theta_x$ in the plane (xOz) and an angle $\Theta_y$ in the plane (yOz).

The useful beam (main pulse) is reflected by the rear face 22, the spurious beam $F_{P1}$ is reflected by the front face 20. The spurious beam, also called spurious pulses, is deflected on the front face 20 by an angle $2\Theta_x$ in the plane (xOz) and $2\Theta_y$ in the plane (yOz). The useful beam is deflected at the output by an angle $2(\Theta_x+\beta'.(n-1)=2(\Theta_x+\beta.(n-1)$ in the plane (xOz) and by an angle $2(\Theta_y+\beta^i.(n-1)=2\Theta y$ in the plane (yOz).

Since the source is a multi-wavelength laser source, the angle β formed by the faces 20 and 22 produces a prismatic effect. Thereby, after the first pass through the active laser medium M, the wavelengths of the first useful beam $F_{U1}$ are angularly separated.

The first optical return unit 18 arranged after the separation of the first useful beam $F_{u1}$ and the first spurious beam $F_{P1}$ along the path of the first useful beam $F_{U1}$ is used for correcting the chromatic spatial dispersion.

More particularly, in the particular example shown in FIG. 1, Θy=0, β'=β and β"=0, so that the whole propagation takes place in the plane (xOz).

It should be noted that at the output of the active laser medium M, the spectral components of the second useful beam $D_{u2}$ form a spot of diameter ϕ+Δϕ. It will be noted that Δϕ includes the increase in diameter brought in by the divergence of the beam during the first pass through the active laser medium M, then the increase brought in by the divergence of the beam between the exit thereof from the active laser medium M and the second entry thereof into the active laser medium M. The same diameter ϕ+Δϕ is found after the second pass through the active laser medium M. To preserve the multi-wavelength character of the output beam, the widening Δϕ of the diameter of the second useful beam $F_{u2}$ has to be small compared with ϕ. This is the case when $$n \gg \frac{n-1}{v}.$$

Indeed, $$\Delta\Phi = L\cdot\tan(2\cdot\beta\cdot\Delta n) = L\cdot\tan\left(2\cdot\beta\cdot\frac{1}{v}\cdot(n-1)\right)$$

$$\text{and } (2\theta_x + \beta\cdot n)) \gg 2\cdot\beta\cdot\frac{1}{v}\cdot(n-1) \text{ when } n \gg \frac{n-1}{v},$$

which means that Δϕ»Φ.

Thereby, the amplification device 10 according to the first embodiment is used for compensating the chromatic spatial dispersion induced by the inclination β of the active laser medium M without, however, bringing in additional losses. On the contrary, the compensation is achieved by an additional pass through the active laser medium M as such, which brings in no losses, but on the contrary more gain.

The amplification device 10 according to the first embodiment is thus used for minimizing optical losses while remaining satisfactory in terms of cooling, gain and temporal contrast.

According to a second embodiment, as can be seen in FIGS. 3 and 4, the elements identical to the amplification device 10 according to the first embodiment described with reference to FIG. 1 are not repeated. Only the differences are highlighted.

In the second embodiment, in addition to the elements of the first amplification device 10, the amplification device 10 comprises a second optical return unit 30 suitable for returning the second useful beam $F_{U2}$ into the active laser medium M for at least a third, then a fourth pass so that the last useful beam at the output of the active laser medium M, called the output beam $F_S$, has a diameter substantially equal to the diameter $\phi$ of the incident beam $F_I$ and so that the sub-beams of each wavelength, forming said output beam $F_S$, are parallel to each other. Thereby, the optical assembly formed by the first optical return unit 18 and the second optical return unit 30 is used for compensating both chromatic spatial dispersion and chromatic lateral dispersion.

Advantageously, as illustrated in FIG. 5, the second optical return unit 30 is configured in such a way that the output beam $F_S$ is equivalent in terms of diameter (chromatic lateral dispersion) and chromatic spatial dispersion to the beam which would have been obtained following the successive pass of an incident beam through a first, then a second plate with plane and parallel faces L1 and L2, the first plate L1 being oriented so that the incident beam arrives on the front face of the first plate at a first angle of incidence $\Theta_1$ equal to the angle of incidence $\Theta$ of the incident beam on the active laser medium M, the second plate L2 being oriented so as to receive the beam at the output of the first plate L1 at a second angle of incidence $\Theta_2$ equal to the opposite of the first angle of incidence $\Theta_1$.

Advantageously, the second optical return unit 30 is suitable for returning the second useful beam $F_{U2}$ into the active laser medium M so that the total number of passes of the beam to be amplified through the active laser medium M is a multiple of four.

In addition or in a variant, the second optical return unit is suitable for returning the second useful beam $F_{U2}$ into the active laser medium M so that the total number of passes of the beam to be amplified through the active laser medium M is a multiple of two and that the beam to be amplified travels an outward path and a return path, superimposed on the outward path, between the first input of said beam into the active laser medium M and the last output of said beam from the active laser medium M. According to the principle of reversibility of light, in this way it is possible to compensate the chromatic lateral dispersion of the beam $F_S$ at the output of the amplification device 10.

In the examples shown in FIGS. 3 and 4, the beam to be amplified makes four passes through the active laser medium M.

More precisely, in the example shown in FIG. 3, the second optical return unit 30 comprises a mirror $M_{AR}$ (plane mirror) suitable for making the beam to be amplified perform a round trip in the amplification device 10. Since the beam to be amplified already makes two passes via the first optical unit 18, the total number of passes through the active laser medium M is four.

In the example illustrated in FIG. 4, the second optical return unit 30 comprises four mirrors M3, M4, M5 and M6. The mirrors M3 and M4 are suitable for returning the second useful beam $F_{U2}$ into the active laser medium M for a third pass into the active laser medium M. The mirrors M5 and M6 are suitable for returning the third useful beam $F_{U3}$ into the active laser medium M for a fourth pass into the active laser medium M. Thereby, total number of passes through the active laser medium M is four. More particularly, in said example, $P_H$ denotes a horizontal plane of symmetry for the mirrors M1, M2 of the amplification device 10 and $P_V$ denotes a vertical plane of symmetry for the mirrors M1, M2 with respect to the mirrors M5, M6. The beam to be amplified enters through the quadrant 1) of the middle M, the second pass is through the quadrant 2), the third pass through the quadrant 3), and the fourth pass through the quadrant 4).

Advantageously, the second optical return unit 30 comprises at least one mirror.

Advantageously, the second optical return unit 30 does not comprise any prism.

Advantageously, the first return unit 18 and the second return unit 30 are arranged outside the path of each spurious beam resulting from an odd pass through the active laser medium M. Thereby, in the examples shown in FIGS. 3 and 4, the first spurious beam $F_{P1}$ and the third spurious beam $F_{P3}$ are not reflected back into the active laser medium M and are thereby eliminated.

When the incident beam $F_I$ and the output beam $F_S$ are superposed, the amplification device 10 comprises e.g. an optical separation assembly 40 for separating the two beams. In the example illustrated in FIG. 3, the optical separation assembly 40 comprises a polarizing cube 42 and a quarter-wave plate 44, as well as a mirror M0.

Preferentially, the incident beam $F_I$ and the output beam $F_S$ are spatially shifted (not superimposed). In particular, such a configuration is illustrated in FIG. 4. Such a configuration makes it possible to dispense with an optical assembly for separating the incident beam $F_1$ and the output beam $F_S$.

During the functioning of the amplification device 10 according to the second embodiment, in addition to the functioning described for the first embodiment, the second useful beam $F_{U2}$ is returned, via the second optical unit 30, to the front face 20 of the active laser medium M, for a third pass through said medium M. A third spurious reflection $F_{P3}$ and a third useful beam $F_{U3}$ result therefrom. The third useful beam $F_{U3}$ is in turn returned, via the second optical unit 30, onto the front face 20 of the active laser medium M, for a fourth pass through said medium M. A fourth spurious reflection $F_{P4}$ and a fourth useful beam $F_{U4}$ result therefrom. It will be noted that in FIG. 2, for the sake of clarity, the spurious reflections $F_{P2}$, $F_{P3}$ and $F_{P4}$ have not been shown.

The configuration of the second optical unit 30 with respect to the first optical unit 18 and to the active laser medium M is thereby used for compensating for the chromatic lateral dispersion of the amplified output beam of the amplification device 10.

By choosing a suitable arrangement of the first return unit 18 and of the second return unit 30, the spurious beams generated during odd passes through the active laser medium M (first and third passes in particular) are not returned to the active laser medium M and are ejected.

The spurious beams generated during even passes through the active laser medium M can also be easily dissociated from the useful beam. Indeed, in the case of a two-dimensional arrangement (FIG. 3), the spurious pulses generated during even passes follow the same optical path as the useful pulses but are delayed with respect to the main pulse. Such pulses will thus be at the origin of a "post pulse" after the useful beam (pulse). Since the spurious pulses arrive after the useful beam, same do not reduce the contrast and are easy to filter. In the case of a three-dimensional arrangement (FIG. 4), the spurious pulses generated during even passes follow the same optical path as the useful pulses but in the opposite direction, and thereby do not affect the contrast.

Thereby, in addition to the advantages of the first embodiment, the amplification device 10 according to the second embodiment is used for compensating for the chromatic lateral dispersion induced during the first two crossings of the active laser medium M, without bringing in additional losses. On the other hand, the compensation is achieved by additional passes through the active laser medium M which thereby bring in an amplification gain while remaining satisfactory in terms of cooling and temporal contrast.

A person skilled in the art will understand that the examples of FIGS. 3 and 4 illustrate only four passes though the active laser medium M. Nevertheless, the second embodiment is generalized to a larger number of passes through the active laser medium M with the condition that the number is a multiple of four (a multiple of two but not four would only compensate for chromatic spatial dispersion but not the chromatic lateral dispersion), or that said number is a multiple of two but that the beam to be amplified makes a round trip through the amplification device 10.

A person skilled in the art would understand that the embodiments and the features of the examples described hereinabove are likely to be combined with one another when such a combination is compatible.

The invention claimed is:

1. A device for amplifying a multi-wavelength laser beam, comprising:

a solid active laser medium comprising a disc comprising:

a front face receiving a beam to be amplified each time the beam passes through the active laser medium; and a reflecting rear face, said front face being inclined with respect to the rear face at a non-zero inclination, said front face and the rear face being inscribed in a right prism with a triangular or trapezoidal base, the rear face being cooled, a beam received on said front face during a first pass being called an incident beam, a beam reflected by the rear face and refracted by said front face during the first pass being called the first useful beam, and a beam reflected by the rear face and refracted by said front face during a second pass being called the second useful beam; and an optical return unit arranged along the path of the first useful beam, comprising first and second mirrors oriented so that the path of the first useful beam between said active laser medium and the first mirror is symmetrical, with respect to a plane of symmetry, to the path of the first useful beam between the second mirror and said active laser medium, the plane of symmetry being a plane perpendicular to a plane containing the base of said active laser medium and to a plane containing said rear face, the optical return unit returning the first useful beam to said front face for a second pass through said active laser medium so that the sub-beams of each wavelength, forming the second useful beam, are parallel to each other at the end of the second pass.

2. The amplification device according to claim 1, wherein said optical return unit is configured in such a way that the second useful beam is equivalent in terms of chromatic spatial dispersion to the beam which would have been obtained at the exit of a plate with plane and parallel faces from an incident beam arriving on the front face of the plate at an angle of incidence equal to the angle of incidence of the incident beam on said active laser medium.

3. The amplification device according to claim 1, wherein said front face receives the incident beam and reflects a beam, called the spurious beam, from the incident beam, said first optical return unit being arranged outside the path of the spurious beam.

4. The amplification device according to claim 1, wherein the second useful beam has an enlarged diameter compared to the diameter of the incident beam, the amplification device further comprising a second optical return unit suitable for returning the second useful beam into said active laser medium for at least a third, then a fourth pass, so that the last useful beam at the output of said active laser medium, called the output beam, has a diameter substantially equal to the diameter of the incident beam and the sub-beams of each wavelength, forming the output beam, are parallel to one another.

5. The amplification device according to claim 4, wherein said second optical return unit is configured such that the output beam is equivalent in terms of diameter and chromatic spatial dispersion to the beam which would have been obtained following the successive pass of an incident beam through a first and then a second plate with plane and parallel faces, the first plate being oriented so that the incident beam arrives on the front face of the first plate at a first angle of incidence equal to the angle of incidence of the incident beam on said active laser medium, the second plate being oriented so as to receive the beam at the output of the first plate at a second angle of incidence equal to the opposite of the first angle of incidence.

6. The amplification device according to claim 4, wherein said second optical return unit returns the second useful beam through said active laser medium so that the total number of passes of the beam to be amplified through said active laser medium is a multiple of four.

7. The amplification device according to claim 4, wherein said second optical return unit is suitable for returning the second useful beam through said active laser medium so that the total number of passes of the beam to be amplified through said active laser medium is a multiple of two and the beam to be amplified travels an outward path and a return path, superimposed on the outward path, between the first input of said beam into said active laser medium and the last output of said beam from said active laser medium.

8. The amplification device according to claim 4, wherein, at each pass through said active laser medium, a spurious beam is obtained, which is directly reflected on said front face of said active laser medium, said return unit and said second return unit being arranged outside the path of each spurious beam resulting from an odd pass of the beam to be amplified through said active laser medium.

9. The amplification device according to claim 1, wherein the last useful beam at the output of said active laser medium is called the output beam, the incident beam and the output beam being spatially shifted.

* * * * *